Dec. 29, 1931.  W. G. SILVUS  1,838,288
TRUCK
Filed Jan. 3, 1931   3 Sheets-Sheet 1

INVENTOR:
WILLIAM G. SILVUS.
BY ATTORNEYS.

Dec. 29, 1931.   W. G. SILVUS   1,838,288
TRUCK
Filed Jan. 3, 1931   3 Sheets-Sheet 2

INVENTOR:
WILLIAM G. SILVUS.

BY   ATTORNEYS.

Dec. 29, 1931.  W. G. SILVUS  1,838,288
TRUCK
Filed Jan. 3, 1931   3 Sheets-Sheet 3
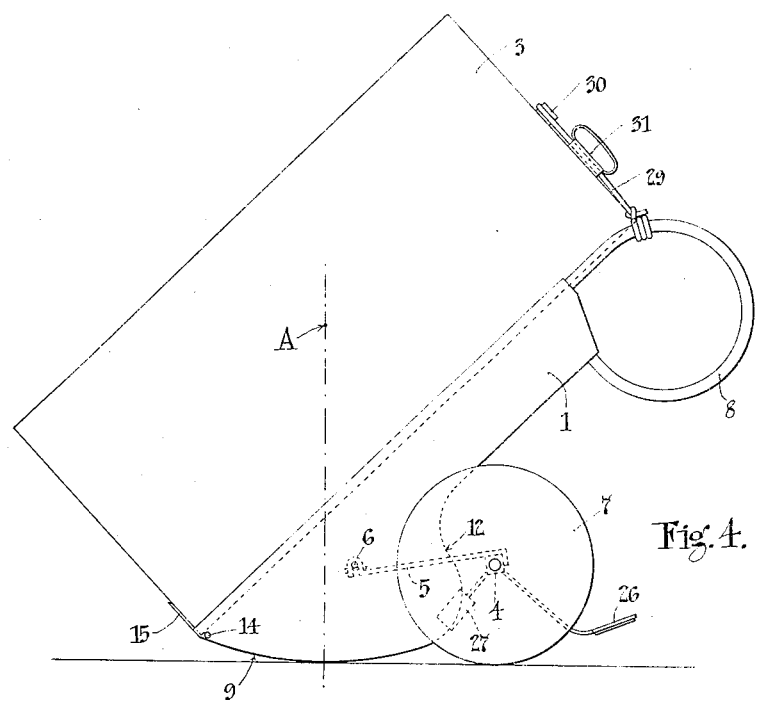
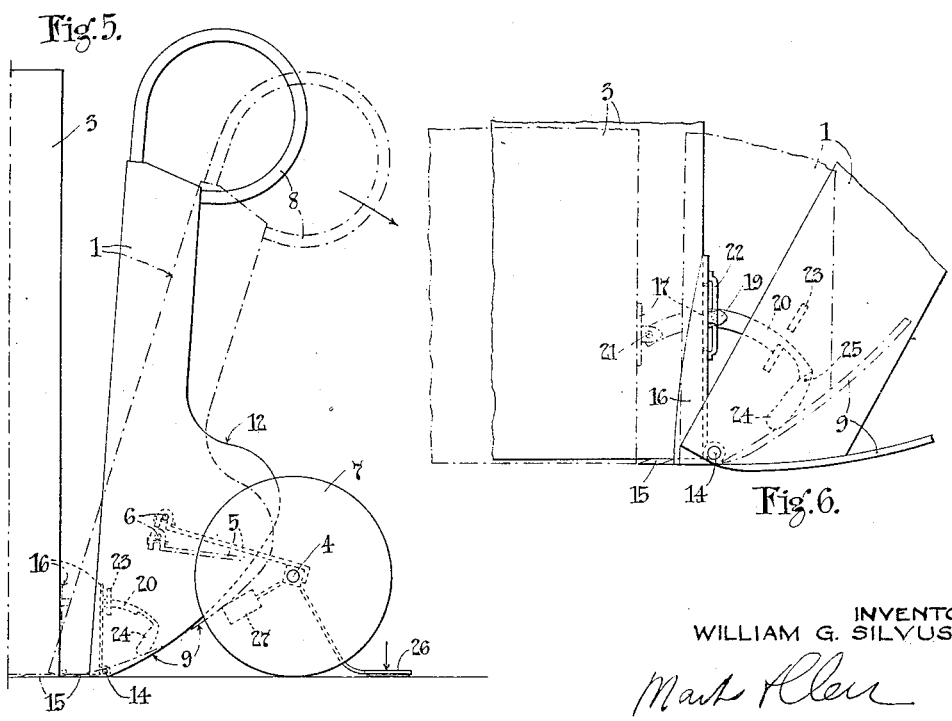
INVENTOR:
WILLIAM G. SILVUS.
BY  ATTORNEYS.

Patented Dec. 29, 1931

1,838,288

UNITED STATES PATENT OFFICE

WILLIAM GREEN SILVUS, OF LIVERPOOL, NOVA SCOTIA, CANADA, ASSIGNOR TO MERSEY PAPER COMPANY, LIMITED, OF LIVERPOOL, NOVA SCOTIA, CANADA

TRUCK

Application filed January 3, 1931. Serial No. 506,447.

This invention relates to hand trucks for enabling heavy loads to be transported from one place to another.

The invention has for its object to provide an improved truck by means of which one operator is enabled easily to transport a heavy load, such as a large roll of newsprint paper, and to load and unload the truck quickly and without exerting any great effort.

An important feature of the invention comprises the provision of arcuate rockers on which the truck may be rocked without the requirement of any appreciable effort. Another feature of the invention is a device for facilitating loading and unloading of the truck.

The invention consists in the combination and arrangement of parts hereinafter fully described and more particularly pointed out in the appended claims.

Figure 1:
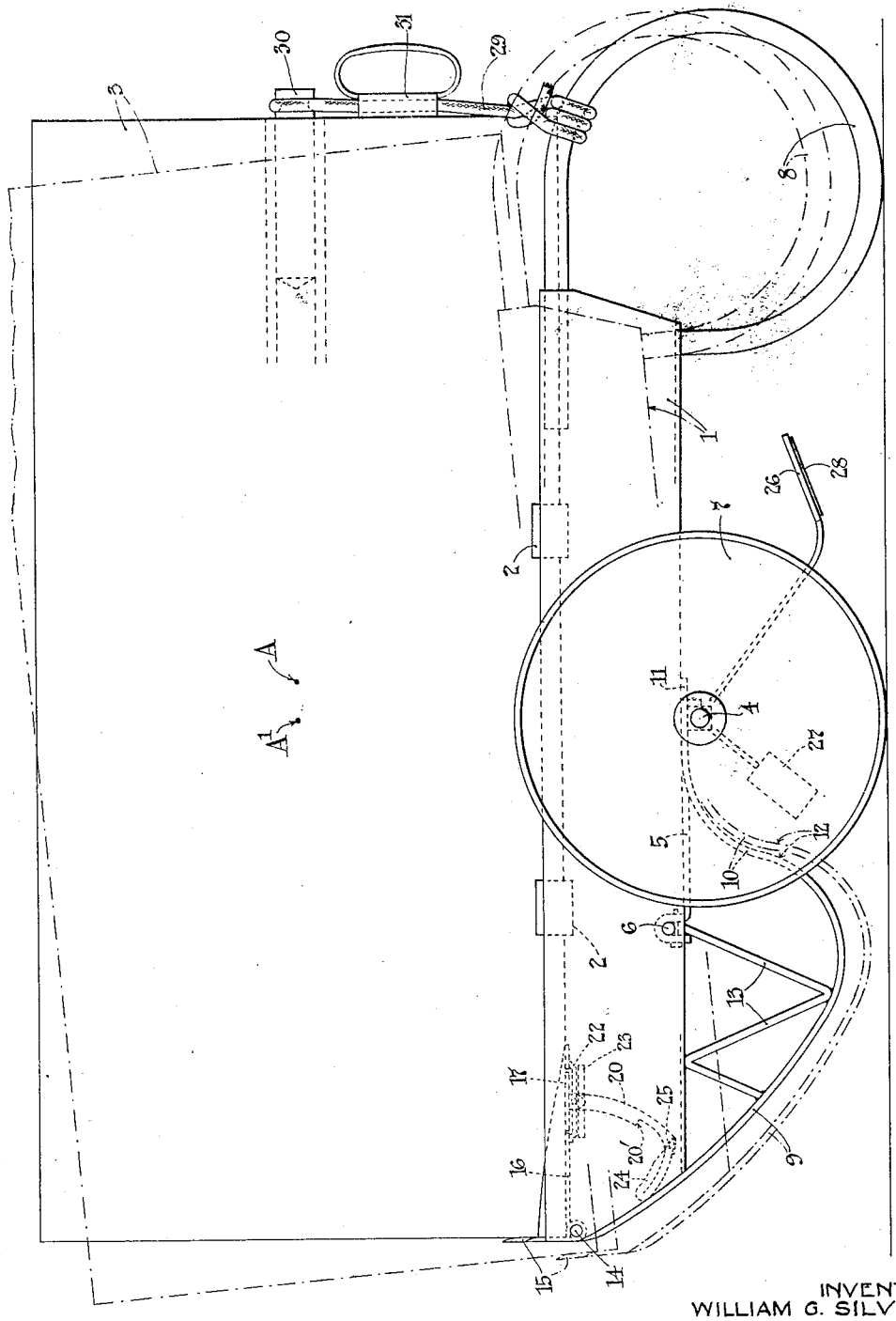
Figure 2:
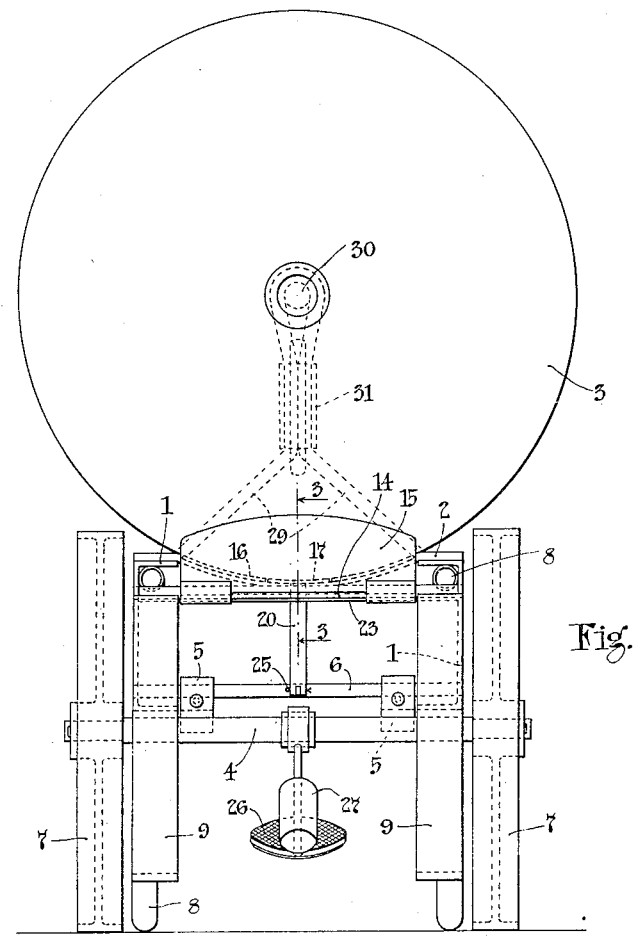
Figure 3:
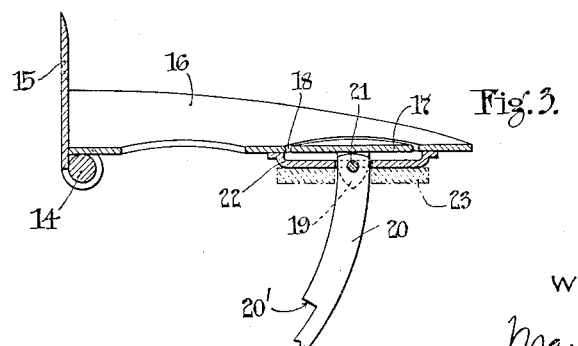

Referring now to the accompanying drawings which illustrate, by way of example, one convenient embodiment of the invention, Figure 1 is a side elevation of the improved truck, Figure 2 is a front elevation, Figure 3 is an enlarged section on line 3—3 of Figure 2, Figure 4 is a diagrammatic side elevation, showing another position of the truck, Figure 5 is a diagrammatic side elevation illustrating the loading of the truck, and Figure 6 is a fragmentary side elevation illustrating the unloading operation.

The invention comprises a pair of side frame members 1, which may conveniently be made of metal channel as shown in Figure 2. The members 1 are rigidly connected by transverse roll-supporting bars 2 which are preferably shaped so as to fit the load, such as a roll of paper 3.

An axle 4 extends across the truck beneath the bars 2 and is rigidly connected to the rear ends of a pair of arms 5, which are pivotally connected at their front ends to a horizontal transverse bar 6, which is mounted rigidly between the members 1. On the ends of the axle 4 wheels 7 are journalled.

To the rear end of each frame member 1 a handle 8 is attached. These handles preferably consist of tubes or bars of circular cross section and bent to form substantially three quarters of a circle with straight ends welded or otherwise suitably attached to the frame members.

Arcuate rockers 9 are attached by welding or otherwise to the under side of the forward ends of the frame members. These rockers extend in an arcuate form from the front ends of the frame members 1 to within a short distance in front of the wheels 7, and at the rear end are curved upwardly at 10 to the frame members, to which they are attached at 11. The curved portions 10 may be roughened on the surface 12 to provide a foothold or tread for a purpose to be described later. The rockers may be made of steel bars or may be made as an integral part of the frame members, as indicated diagrammatically in Figures 4 and 5. When constructed as in Figures 1 and 2 the bars 9 may be strengthened by suitable reinforcements such as 13.

A horizontal bar or shaft 14 connects the frame members 1 adjacent the forward end thereof and pivotally mounted on this bar is a device for facilitating loading and unloading of the truck. The device comprises a lip 15 and an arcuate supporting plate 16, arranged at right angles to each other.

The plate 16 carries an extractor consisting of a disc 17 normally disposed in a circular aperture 18 in the plate 16. The disc 17 carries a pair of lugs or brackets 19 between which an arcuate latch 20 is pivoted on a pin 21. The latch 20 is held in normal position and guided in its movement by means of a plate 22 which is formed with lugs connected to the back of the plate 16. The latch 20 also passes through a hole in a flat bar 23 which is carried by the frame members 1. The centre of curvature of the latch 20 coincides substantially with the axis of pivotal movement of the loading and unloading device about the bar or shaft 14. A counterweight 24 is provided on the lower end of the latch, the counterweight being preferably detachably connected to the latch 20 by means of a pin 25 which will readily shear off and thereby release the weight if the pin is subjected to undue shearing stresses.

Freely mounted on the axle 4 is a pedal 26 normally maintained in an elevated position, as indicated in Figure 1, by means of a counterweight 27. The under surface of the pedal 26 is provided with a facing of friction material such as rubber 28, or may be provided with serrations or points, depending on the nature of the ground or floor on which the truck is to be used.

Any suitable means may be furnished for securing the rear end of the load upon the truck. For example, a rope 29 tied at the ends to the handles 8 may be looped over a plug 30 mounted in the tubular core of the roll 3, the rope being drawn taut by means of a sliding keeper 31.

An important feature of the invention relates to the radius of curvature of the sectors 9 in relation to the centre of gravity of the load 3. The axis of curvature of the sectors 9 intersects the centre of gravity of the load 3, the centre of gravity, when the truck is at rest, (see full lines in Figure 1), being indicated at A. The radius of curvature of the sectors is preferably substantially equal to the height of the centre of gravity about the floor. The handles 8 form rests or supports for the rear end of the truck, as shown in full lines in Figure 1, and in this position the lowermost parts of the sectors 9 are spaced from the floor.

The arrangement may conveniently be such that when the truck is in the position shown in full lines in Figure 1 the centre of gravity of the load is slightly in rear of the vertical plane containing the axle 4. When the handles 8 are raised to bring the truck to wheeling position (see dotted lines, Figure 1), the load 3 is moved forward to bring the centre of gravity to the position $A^1$, which is vertically over the axle 4. The truck is wheeled on the wheels 7 and as if the truck itself is substantially balanced about the axle 4, a very large load, such as a 1600-pound roll of newsprint paper, can be wheeled easily as the load is distributed equally in front and rear of the points of support of the truck.

When the load is to be deposited on the floor the handles 8 are raised until the rockers 9 engage the floor and the truck is rocked forwardly on the rockers. As the truck rocks about the centre of gravity, the latter moves forward in a straight horizontal line, so that the movement does not call for any raising or lowering of the load, and consequently the rocking movement can be performed with very little effort as the truck is substantially in equilibrium in any position. The rocking movement is continued until the roll 3 is in upright position on the floor. During the last portion of the movement after the centre of gravity has advanced beyond the forward ends of the rockers 9, the load can be prevented from descending too rapidly by the operator standing on the foot rests 12 and pulling rearwardly on the handles 8. As soon as the load is on its end the truck is released from the load by sliding the keeper 31 towards the plug 30 and removing the rope 29 from the plug 30. The truck is then rocked rearwardly until the bar 23 passes beyond the shoulder $20^1$ on the latch 20. The weight 24 causes the latch to descend to move the shoulder $20^1$ into the path of the bar 23. (See full lines in Figure 6). The truck is again rocked forwardly and the bar 23 forces the latch 20 forwardly to move the extractor disc 17 out of the aperture 18 in plate 16. The truck fulcrums about the extractor and the lip 15 is thus withdrawn from beneath the roll. (See chain-dotted lines in Figure 6).

If the operator neglected to rock the truck forwardly to withdraw the lip 15, the bar 23 would engage the counterweight 24 and might cause damage to the extractor device if the weight were integral with the latch 20. With the construction described, however, the pin 25 would shear off and release the weight from the latch, thus obviating any risk of damage.

When the truck is being rocked back to the wheeling position, the weight 24 (see dotted lines in Figure 1) automatically causes the latch 20 and extractor disc 17 to be returned to normal position. When another roll is to be placed on the truck the latter is wheeled up to the roll and rocked into the position indicated in full lines in Figure 5, with the lip 15 against the bottom of the roll 3. The operator next steps on the pedal 26 and depresses it into contact with the floor, and then pulls on the handles 8. The wheels 7 cannot move rearwardly, and the truck therefore pivots about the shaft 6, while the arms 5 swing downwardly about the axle 4. In this way the truck moves to the position shown in dotted lines in Figure 5, and the lip 15 is thus forced under the roll 3. The truck is then rocked up to move the supports 2 into contact with the roll, and the handles 8 are connected to the plug 30 as already described. The operator then stands on the treads 12 and pulls the loaded truck back to the wheeling position. The only substantial effort required is that needed to raise the centre of gravity of the load up to the level shown in Figures 1 and 4. As soon as this level has been reached and the centre of gravity has moved to a vertical plane in rear of the front end of the truck, no further material effort will be required to manipulate the truck, no matter how heavy the load may be. For example, the invention enables an operator, single-handed, to handle a sixteen-hundred-pound roll of paper quite easily.

It will be understood that the foregoing description and accompanying drawings are given by way of example only, and that many modifications within the scope of the appended claims may be resorted to without departing from the invention.

What I claim is:

1. A truck for carrying a heavy load, comprising a frame, a pair of parallel arms pivotally mounted on said frame, a transverse, horizontal axle connected to the rear end of said arms, ground wheels journalled on the ends of said axle one on each side of said frame, a pair of handles at the rear end of said frame shaped so as to normally support the frame in a substantially horizontal position, and a pair of arcuate rockers on the underside of said frame in front of said wheels, the rockers being arranged with their axis of curvature above the top of said frame and substantially over said axle when the truck is in position to be wheeled on said wheels, and the rockers extend forwardly to a transverse line closely adjacent the lowermost point of the front end of the load so that the truck can be locked on said rockers to a substantially vertical position, each of said handles consisting of a member of circular cross section bent to the form of a large loop connected at each end to the frame.

2. A truck for carrying a heavy load, comprising a frame, ground wheels connected to the frame, arcuate rockers on the underside of the frame in front of said ground wheels, said rockers being so arranged that their axis of curvature substantially intersects the centre of gravity of the load, and a device to facilitate loading and unloading of the truck, said device comprising a plate to support the forward end of the load, means for pivotally mounting said plate on said frame to rock about a transverse axis adjacent the front ends of said rockers, a lip rigidly connected with said plate to engage the front end of the load, an arcuate latch slidably mounted with respect to said plate and having its centre of curvature substantially coincident with the axis of rotation of said plate, an extractor member pivoted to said latch, means on the frame to engage the latch to force the extractor member away from the supporting plate to disengage the lip from the load after the latter has been deposited on the ground.

3. A truck for carrying a heavy load, comprising a frame, ground wheels connected to the frame, arcuate rockers on the underside of the frame in front of said ground wheels, said rockers being so arranged that their axis of curvature substantially intersects the centre of gravity of the load, and an extractor device comprising a supporting plate, a lip rigidly connected with said plate, a transverse shaft adjacent the forward ends of said rockers on which said plate and lip are pivotally mounted, an extractor member normally disposed in an aperture in said plate, a curved latch pivotally connected with said extractor member, a transverse bar mounted on the frame and adapted to coact with said latch to project said extractor from said plate, a weight, and a shear pin to connect said weight to said latch.

In testimony whereof I have affixed my signature.

WILLIAM GREEN SILVUS.